United States Patent
Legras et al.

(10) Patent No.: US 7,419,612 B2
(45) Date of Patent: Sep. 2, 2008

(54) METHOD OF CREATING PORES IN A THIN SHEET OF POLYIMIDE

(75) Inventors: Roger Legras, Hannut (BE); Etienne Ferain, Masnuy-Saint-Jean (BE)

(73) Assignee: Universite Catholique De Louvain, Louvain-La-Neuve (BE)

( * ) Notice: Subject to any disclaimer, the term of this patent is extended or adjusted under 35 U.S.C. 154(b) by 125 days.

(21) Appl. No.: 11/131,943

(22) Filed: May 18, 2005

(65) Prior Publication Data

US 2006/0000798 A1  Jan. 5, 2006

Related U.S. Application Data

(63) Continuation of application No. PCT/EP03/12780, filed on Nov. 14, 2003.

(30) Foreign Application Priority Data

Nov. 19, 2002 (FR) .................... 02 14473

(51) Int. Cl.
*B31D 3/00* (2006.01)
(52) U.S. Cl. .............. 216/56; 216/57; 216/87; 216/94; 264/413
(58) Field of Classification Search ........ 216/56, 216/57, 87, 94; 264/413
See application file for complete search history.

(56) References Cited

U.S. PATENT DOCUMENTS 3,303,085 A   2/1967   Price et al.
3,415,993 A   12/1968  Fleischer et al.
3,493,751 A   2/1970   Davies et al.
3,612,871 A   10/1971  Crawford et al.
3,662,178 A   5/1972   Caputi et al.
3,677,844 A   7/1972   Fleischer et al.
3,713,921 A   1/1973   Fleischer et al.
3,742,182 A   6/1973   Saunders
3,770,532 A   11/1973  Bean et al.
3,802,972 A   4/1974   Fleischer et al.
3,852,134 A   12/1974  Bean
4,115,303 A   9/1978   Marchand et al.
4,652,412 A   3/1987   Chiulli (Continued)

FOREIGN PATENT DOCUMENTS

DE   3816078   11/1989

(Continued)

OTHER PUBLICATIONS

"Pore geometry of etched ion tracks in polymide"; Trautmann et. al.; Nuclear Instruments & Methods In Physics Research, Section B: Bean Interactions with Materials and Atoms (Apr. 1996'), vol. B111, No. 1-2, pp. 70-74.*

(Continued)

*Primary Examiner*—George A. Goudreau
(74) *Attorney, Agent, or Firm*—Harness, Dickey & Pierce, P.L.C.

(57) ABSTRACT

The invention concerns a method which consists in first subjecting the polyimide sheet to ionic bombardment, followed by an irradiation in the visible domain and finally a relatively brief chemical etching. Said method enables a thin polyimide sheet comprising pores, of nanometric to micrometric size, having a substantially cylindrical shape and substantially equal diameters to be obtained.

20 Claims, 7 Drawing Sheets

U.S. PATENT DOCUMENTS

| | | | |
|---|---|---|---|
| 4,832,997 A | 5/1989 | Balanzat et al. | |
| 4,855,049 A | 8/1989 | Toulemonde et al. | |
| 4,872,888 A | 10/1989 | Ehrfeld et al. | |
| 4,923,608 A | 5/1990 | Flottman et al. | |
| 4,956,219 A * | 9/1990 | Legras et al. | 343/771 |
| 5,234,538 A | 8/1993 | Lück | |
| 6,861,006 B2 * | 3/2005 | Ferain et al. | 216/56 |
| 2003/0020024 A1 * | 1/2003 | Ferain et al. | 250/492.1 |

FOREIGN PATENT DOCUMENTS

| | | | |
|---|---|---|---|
| DE | 43 19 610 | | 5/1994 |
| EP | 0109147 | | 5/1984 |
| GB | 1375204 | | 4/1974 |
| WO | WO 87/05850 | | 10/1987 |
| WO | WO 98/30317 | | 7/1998 |
| WO | 2001/49403 | * | 7/2001 |
| WO | 2002/49402 | * | 7/2001 |

OTHER PUBLICATIONS

"Sodium hypochlorite as a developer for heavy ion tracks in polymide"; Klintberg et. al.; Nuclear Instruments & Methods in Physics Research, Section B: Beam Interactions with Materials and Atoms (2001'), 184 (4), pp. 536-543.*

"Bulk-etching behavior of Kapton and Thermalimide track detectors"; Chakarvarti et.al.; Nuclear Tracks and Radiation Measurements (1992'), 20(4), abstract only.*

A.I. Vilensky et al., "Polyimide Track Membranes for Ultrafiltration and Microfiltration," Polymer Science, vol. 36, No. 3, pp. 391-400 (1994).

L. Klintberg et al, "Sodium hypochlorite as a developer for heavy ion tracks in polyimide," Nuclear Instruments and Methods in Physics Research B, vol. 184, pp. 536-543 (2001).

P.Yu. Apel et al., "Morphology of latent and etched heavy ion tracks in radiation resistant polymers polyimide and poly(ethylene naphthalate)," Nuclear Instruments and Methods in Physicas Research B, vol. 185, pp. 216-221 (2001).

PCT/EP 03/12780, PCT International Search Report, Mar. 3, 2004.

S.K. Chakarvarti et al., "Bulk-Etching Bevahiour of Kapton and Thermalimide Track Detectors," Nucl. Tracks Radiat. Meas., vol. 20, No. 4, pp. 589-594 (1992).

* cited by examiner

METHOD OF CREATING PORES IN A THIN SHEET OF POLYIMIDE

CROSS REFERENCE TO RELATED APPLICATIONS

This is a continuation application of Ser. No. PCT/EP2003/012780, filed Nov. 14, 2003, which claims priority to French Appln. No. 0214473, filed Nov. 19, 2002, both of which are incorporated by reference herein.

BACKGROUND AND SUMMARY OF THE INVENTION

The invention concerns a method of creating pores of nanometric to micrometric size in a thin sheet of polyimide, as well as a thin sheet of polyimide obtained by this method.

Methods of creating pores of nanometric to micrometric size in a polymeric material in sheet form, such as ethylene polyterephthalate or polycarbonate, are already known. However, these materials do not exhibit great thermal resistance. Polycarbonate, for example, has much less good properties beyond 150° C.

Conversely, polyimides preserve their excellent physical, electrical and mechanical properties in a very wide range of temperatures, and in particular at very high (beyond 400° C.) or very low temperatures. Thus the use of polyimides is particularly sought in certain applications, and new applications may even be envisaged. By way of example, thin sheets of polyimide comprising pores of nanometric to micrometric size can be used as filtering membranes, as a support for synthesizing filaments or tubes, in particular nanofilaments or nanotubes, in the connection field, etc.

The known methods of creating pores of nanometric to micrometric size in a polymeric material in sheet form are for example described in the international patent applications published under the numbers WO 01/49402 and WO 01/49403, from the applicant. These methods comprise the successive steps consisting of subjecting the sheet to:

an ion bombardment;
a UV radiation;
chemical etching.

However, these methods do not successfully apply to polyimides. This is because the applicant has found that the use of this method on sheets of polyimide results in the obtaining of pores of very different diameters and non-cylindrical shape, which is not desirable in many applications. The shape and the consistency of the diameter of the pores can be improved, but chemical etching of several hours is then necessary.

The aim of the invention is to resolve these problems by providing a method for creating pores with a substantially cylindrical shape and substantially equal diameters in a thin sheet of polyimide, the method not requiring a step of chemical etching of long duration. To this end, and according to a first aspect, the invention concerns a method of creating pores of nanometric to micrometric size in a thin sheet of polyimide, in which the sheet is subjected, in this order, to:

an ion bombardment;
a radiation in the visible range;
a chemical etching.

The irradiation of the sheet in the visible range increases the quantity of damage caused in the sheet along the path of the ions previously bombarded on the said sheet—which is not the case with UV irradiation, as found by the applicant. As a result the chemical etching of the sheet is more rapid at this damage, which leads to the formation of pores of substantially cylindrical shape and substantially equal diameters.

According to the invention, the sheet is subjected to a radiation whose wavelength is between 360 and 550 nm, or even between 450 and 530 nm. According to one possible embodiment, use is made of a source emitting in the visible range and which gives off a sufficiently small quantity of heat not to require cooling of the sheet. For example, the sheet is subjected to the radiation of one or more LEDs, emitting at wavelengths between 450 and 530 nm, for a period of between 1 and 10 hours. The sheet can also be subjected to the radiation of a halogen spot lamp for a period of around from 10 hours to one week, and to the radiation of a UV-Hg source coupled to a UV filter, emitting at wavelengths of between 360 and 580 nm.

According to other characteristics, the sheet is subjected to chemical etching for less than one hour, or even less than 15 minutes. The chemical etching can be carried out by a solution of NaOCl with a concentration of between 0.01 N and 5 N at a temperature of between 30° and 100° C. After having been subjected to the ion bombardment and before being subjected to the radiation in the visible range, the sheet can be subjected to global heat treatment, certain predetermined areas of the sheet only being subjected to the said radiation, so as to effect a "patterning".

Finally, according to a second aspect, the invention concerns a thin sheet of polyimide comprising pores of nanometric to micrometric size, obtained by the method as previously described, the pores being substantially cylindrical and having substantially equal diameters. The sheet has for example a thickness of between 2 and 100 µm. According to another embodiment, the sheet has a thickness of between 5 nm and 10 µm, and is deposited on a support.

BRIEF DESCRIPTION OF THE DRAWINGS

The other characteristics of the invention arise from the following description of embodiments, a description given with reference to the accompanying drawings, in which.

DETAILED DESCRIPTION

Figure 1:
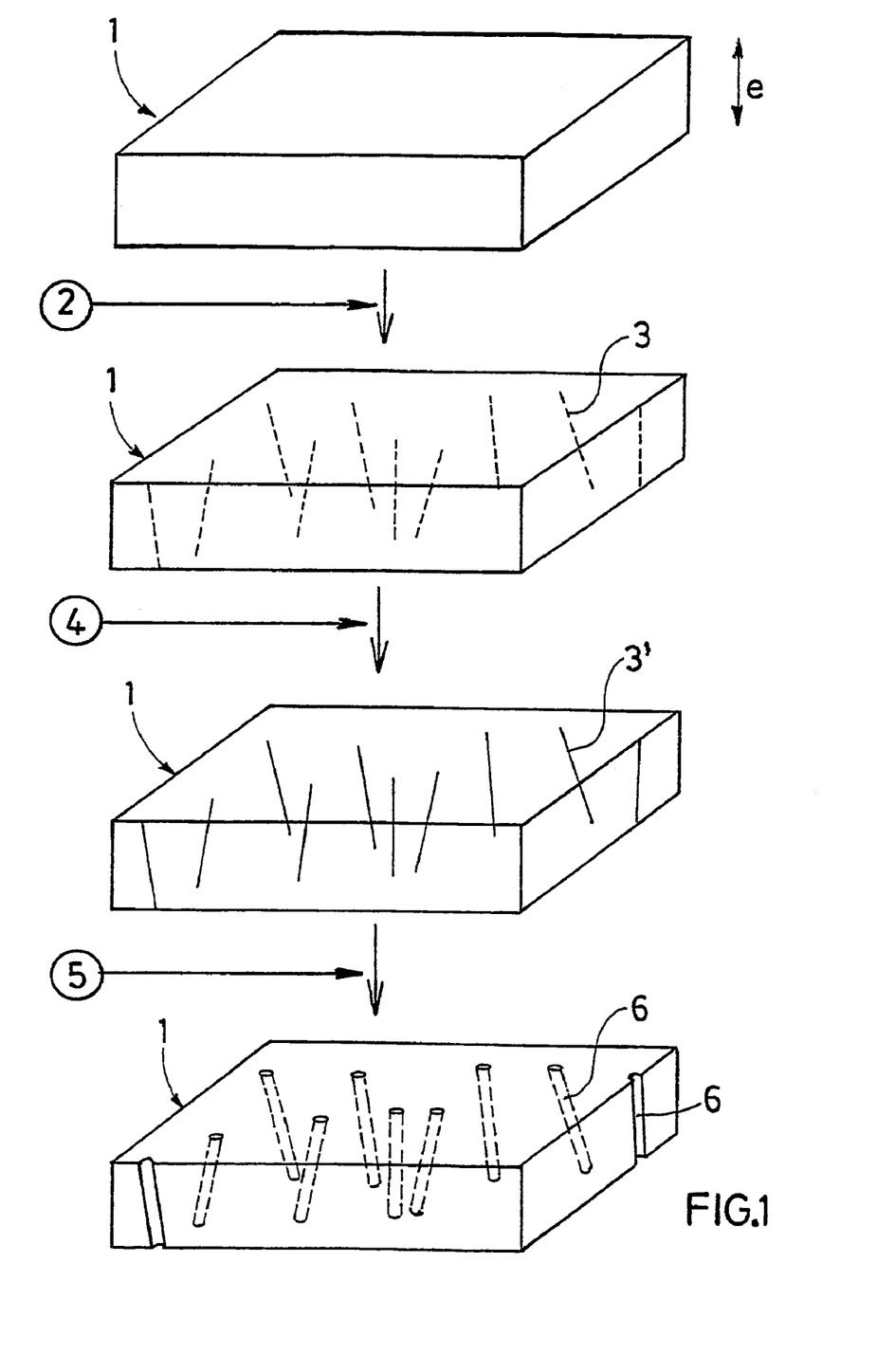
FIG. 1 is a schematic representation of the various steps of the method according to a first embodiment of the invention.

Reference is made first of all to FIG. 1. The method is applied to a thin sheet 1 of polyimide, for example a thin sheet of Kapton®, sold by DuPont. Kapton® is synthesised by a polycondensation reaction between an aromatic dianhydride and an aromatic diamine. No organic solvent is known for it, it does not melt and resists flame very well. These remarkable properties make it possible to use it in a wide range of temperatures (applications made at temperatures which may drop to −269° C. and rise to 400° C.

The expression "thin sheet" designates:
either an isolated film, that is to say not deposited on a support, having a thickness e of several microns, for example between 2 and 100 µm;
or a "spin coated" film having a thickness e of a few nanometres to several microns, for example between 5 nm and 10 µm, deposited on a thin support, such as a silicon support, the thickness of which may vary from several hundreds of microns to several millimetres.

Such a sheet can be obtained by the deposition, on a silicon support, of a monomer solution in a solvent, and then heating of the whole so as to create a thin film of polyimide on the support.

It is for example possible to use a 14 to 20% by weight solution of polyamic acid in N-methyl-2-pyrrolidone (PI2808, available commercially) and to carry out a first heating at 90° C. for 30 minutes, and then a second heating at 400° C. for one hour. The method according to the invention is identical for an isolated film or a layer deposited on a support.

The sheet 1 is first of all subjected to an ion bombardment 2. The bombardment 2 is effected by a beam of energetic ions, preferably heavy ions issuing from rare gases such as xenon, such a beam being for example obtained by a particle accelerator such as a cyclotron with separate sectors. The energy of the beam is around 570 MeV (megaelectronvolts), the density of ions bombarding the sheet 1 being between $10^4$ and $10^{13}$ ions/cm². Other ions can be used for the bombardment 2, such as ions issuing from argon, krypton, cobalt, lead, gold or uranium. The energy of these ions is between 1 and 10 MeV/amu (atomic mass unit) the intensity of the beam being able to vary between $10^6$ and $10^{13}$ ions/s.

The bombardment 2 is carried out on a single face of the sheet 1, the energy of the ions being sufficient for these to pass through the entire thickness of the said sheet 1. The sheet 1 can be in the form of a strip passing substantially perpendicular to the beam of ions, the said beam effecting a scanning so that each area of the strip is bombarded on several occasions. Along their path within the sheet 1, the ions cause physical and chemical modifications to the polyimide, thus creating damage in the sheet 1, forming traces 3, depicted in dotted lines in FIG. 1. The bombardment 2 of the sheet 1, if it is carried out with minimum energy, thus leads to the formation of traces 3 which can be etched chemically during a subsequent step. This bombardment 2 is the step which determines the density of the pores which will be created in the sheet 1.

Next the sheet 1 is subjected to radiation 4 in the visible range. Subjecting the sheet 1 to visible radiation 4 increases the quantity of damage along the traces 3, sensitising the traces 3 and thus creating more marked traces 3', depicted in solid lines in FIG. 2. Because of this, the more marked traces 3' will be chemically etched more rapidly during a subsequent step, which will lead to the obtaining of pores with a substantially cylindrical diameter, compared with a slow chemical etching which leads to the obtaining of pores with poorly controlled shape.

According to a first variant, the sheet 1 is subjected to the radiation of one or more LEDs (light emitting diodes), for example from a light source composed of 100 LEDs, the individual power of which is between 1 and 10 mW. LEDs emitting in the blue range (between 450 and 490 nm, with a maximum intensity around 470 nm) or LEDs emitting in the blue-green range (between 470 and 540 nm, with a maximum intensity around 510 nm) can for example be used. An irradiation of short duration, approximately eight hours, with such an LED is effective for sensitising the traces 3 created in the sheet 1 by the bombardment 2 (for an isolated film or a layer deposited on a support). The irradiation of the sheet 1 by an LED does not lead to heating of the said sheet 1 and there is therefore no risk of partially erasing the traces 3. Consequently, no cooling of the sheet 1 is necessary and the more marked traces 3' will be chemically etched quickly, thus leading to the creation of substantially cylindrical pores.

According to a second variant, the sheet 1 is subjected to the radiation of a halogen spotlight, for a period of around 10 hours to one week. The radiation of the halogen spotlight covers for example wavelengths of between 380 and 850 nm. Sensitisation of the traces 3 created in the sheet 1 is also obtained, by means of longer irradiation and air cooling of the said sheet 1, in order to prevent partial erasure of the traces 3.

According to a third variant, the sheet 1 is subjected to the radiation of a UV-Hg source emitting in a wide range of wavelengths, for example between 200 and 580 nm, for 10 hours. The combination of the UV-Hg source and a UV filter cutting wavelengths less than 360 nm results in an effective sensitisation of the traces 3 created in the sheet 1. The higher the irradiation doses, the greater will be the rate of chemical etching of the more marked traces 3', during a subsequent step. However, the UV-Hg source gives off a large quantity of heat. In order to prevent partial erasure of the traces 3 following the resulting increase in the temperature of the sheet 1, it is necessary to cool the said sheet 1 by a circulation of water. This can be tricky to implement.

Finally, the sheet 1 in which more marked traces 3' were created is subjected to a chemical etching 5. The sheet 1 is immersed in a corrosive solution, such as an aqueous solution of NaOcl, with a pH of between 7.5 and 13 and a temperature of between 30° and 100° C. The concentration of the solution may vary between 0.01 N and 5N. Other solutions can be used for the chemical etching of the sheet 1. By way of example it is possible to cite NaOH, KOH, $NH_4OH$, $(CH_3)_4NOH$, a solution of sulphuric acid and hydrogen peroxide.

The parts of the sheet 1 damaged by the previous steps of the method, namely the more marked traces 3', are rapidly attacked by the corrosive solution. The duration of the chemical etching is thus less than one hour, or even less than 15 minutes. The result is the formation of pores 6 of substantially cylindrical shape, that is to say whose diameter varies by less than 20% over the entire thickness e of the sheet 1, and with substantially equal diameters, that is to say distributed in a range of ±10% around a mean value. According to the parameters used when the method is implemented, the diameter of the pores 6 may vary from 10 nm to 10 µm.

The sheets 1 are then washed until the pH is neutralised, rinsed and dried. The various steps of the method can be carried out continuously, the sheet 1, in strip form, moving so that each area of the said strip is first of all subjected to the ion bombardment 2, to the visible radiation 4 and then to the chemical etching 5.

Figure 2:
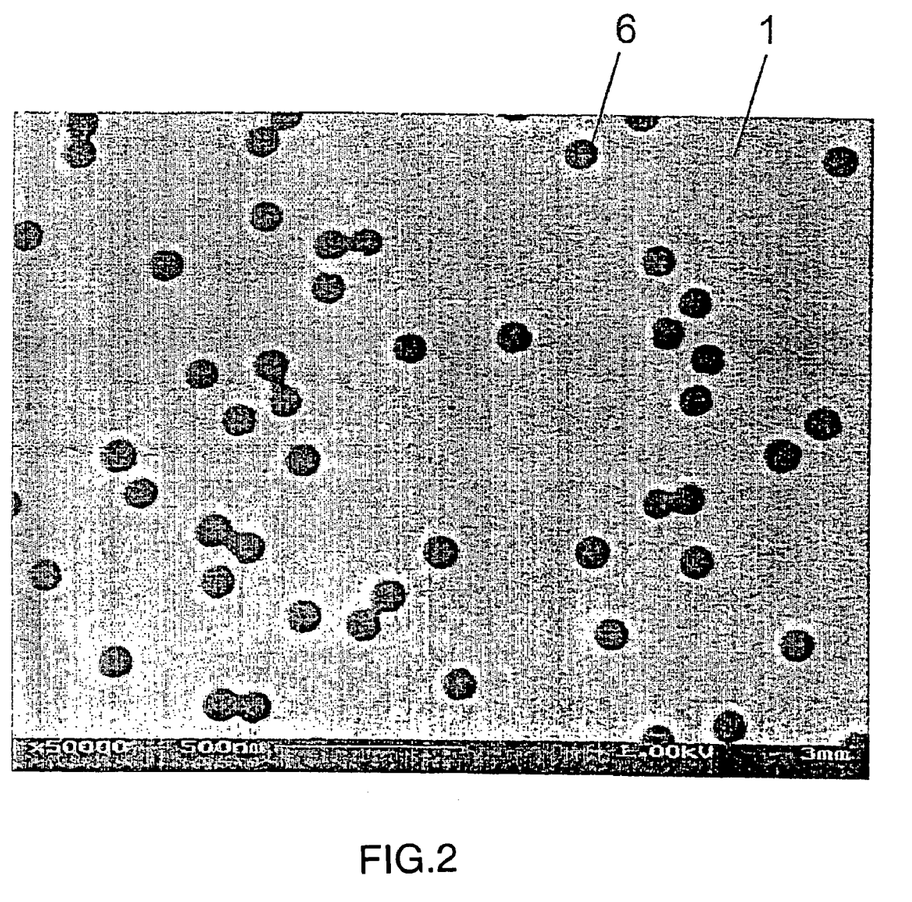
FIG. 2 is a photograph taken with a scanning electron microscope (SEM) of the surface of a sheet of polyimide, deposited on a silicon support, having pores obtained by the method shown diagrammatically in FIG. 1.

FIG. 2 shows, seen under SEM, the surface of a sheet 1 of polyimide deposited on a silicon support and having pores 6 obtained by the method of FIG. 1. The pores 6 are substantially cylindrical and have substantially identical diameters, around 90 to 95 nm. The sheet 1 in which the pores 6 were created can then be used as a support for the synthesis of tubes or filaments 7, in particular nanotubes or nanofilaments, for example made from metal (copper, cobalt, nickel, iron, lead, bismuth, gold, silver, etc) or polymer (polyaniline, polypyrrole, polystyrene, etc). Naturally, the shape of the nanotubes or nanofilaments 7 corresponds to the shape of the pores 6.

The nanotubes or nanofilaments 7 can be synthesised according to several methods:

- electrodeposition of the material making up the nanotubes or nanofilaments 7 in the pores 6, the sheet 1 being immersed in an electrolyte and placed, on one of its faces, on an electrode;
- chemical synthesis, the monomer being introduced into each pore 6 through a first opening, situated on one face of the sheet 1, and an initiator (such as $FeCl_3$ for example) being introduced into each pore 6 through a second opening, situated on the opposite face of the sheet 1;
- deposition of the material making up the nanotubes or nanofilaments 7 in the pores 6 without an electrode, by the use of the activation of the surface of the pores 6.

The nanotubes or nanofilaments 7 are then recovered after degradation of the sheet 1 of polyimide in an aqueous medium with a highly basic character and filtration of the mixture obtained through a silver membrane. The nanotubes or nanofilaments 7 are retained on the surface of the silver membrane.

FIGS. 3a to 3c, 4a to 4c and 5a, 5b are photographs taken under SEM of nanotubes 7 produced from a sheet 1 of Kapton® of the HN30 type, with a thickness of 7.6 µm, having pores 6.

Figure 3A:
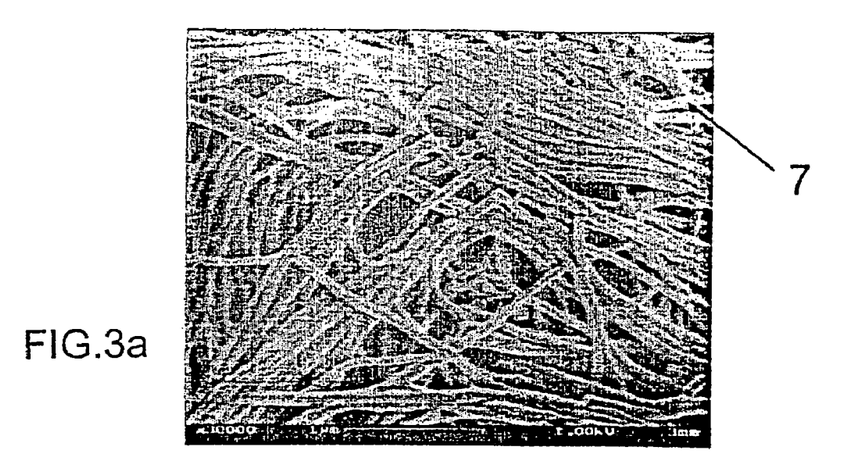
FIGS. 3a to 3c, 4a to 4c and 5a, 5b are photographs taken with an SEM of nanotubes produced from a sheet of polyimide having pores obtained by the method shown diagrammatically in FIG. 1.
Figure 3B:
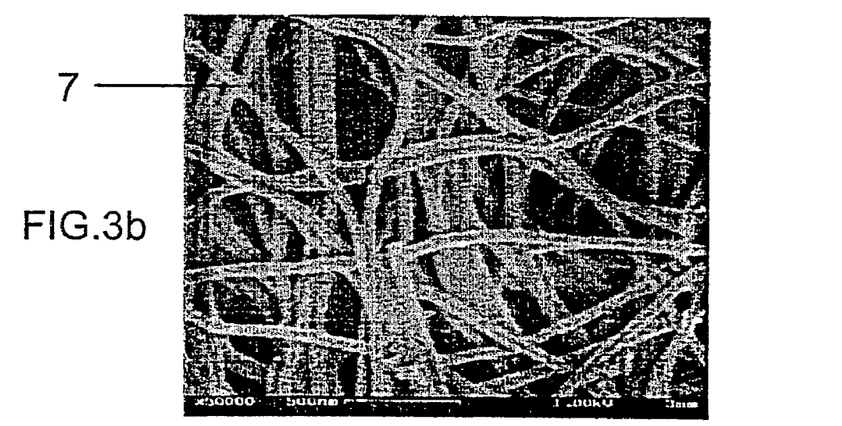
Figure 3C:
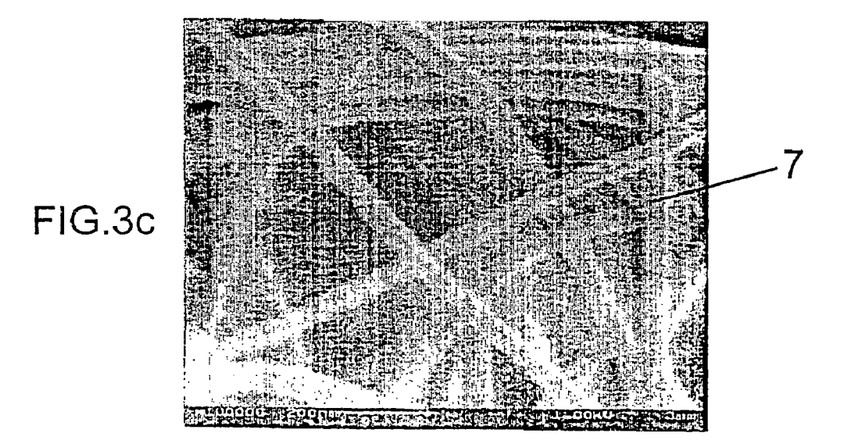

FIGS. 3a to 3c

The bombardment 2 of the sheet 1 was carried out by means of a beam of Xe ions, with an energy of 574 MeV. The sheet 1 was then subjected to the radiation of a halogen spotlight for 10 hours and then to chemical etching in a 0.02 N solution of NaOCl at 70° C. for seven minutes. Polypyrrole nanotubes 7 were synthesised chemically in the pores 6 created in the sheet 1. The nanotubes 7 have a substantially cylindrical shape over their entire length and substantially equal diameters, around 40 nm.

Figure 4A:
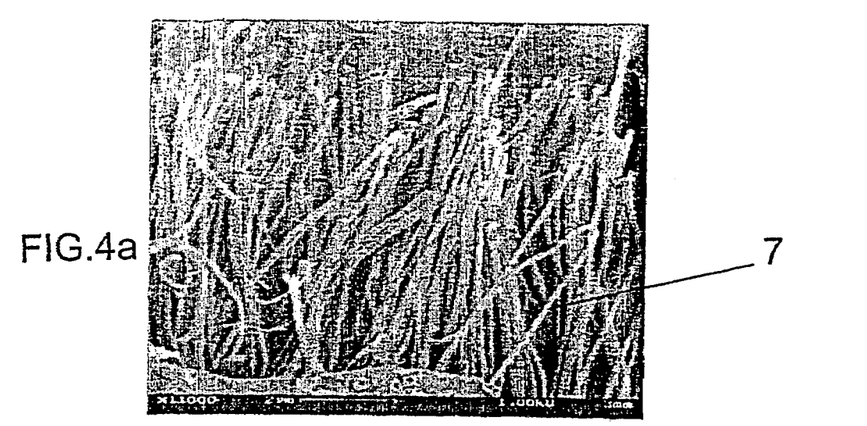
Figure 4B:
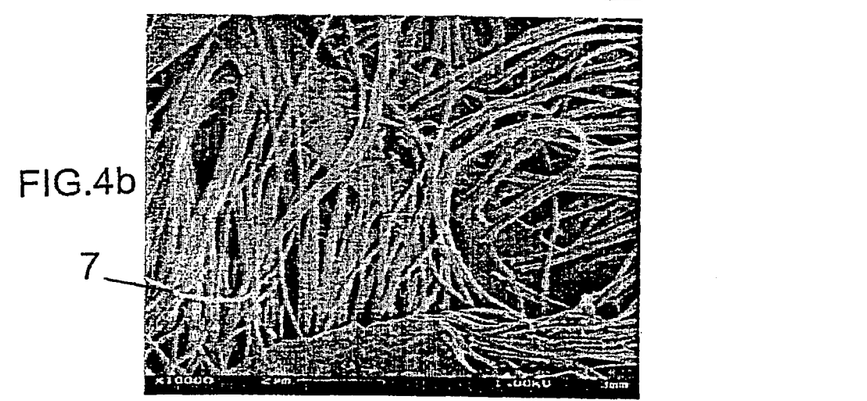
Figure 4C:
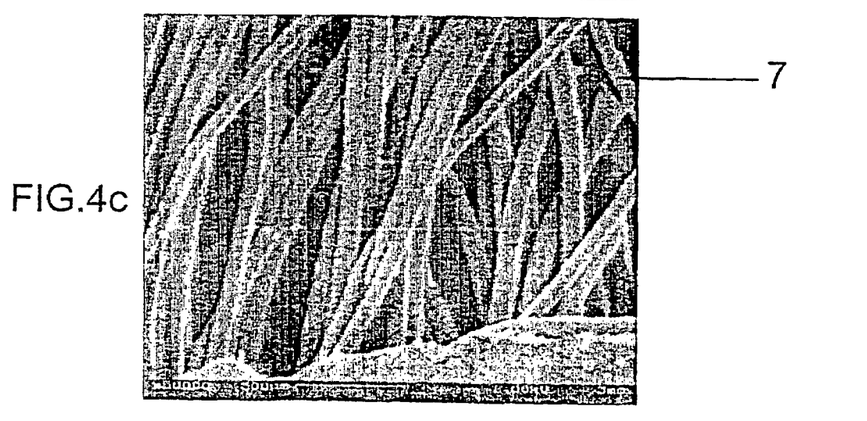

FIGS. 4a to 4c

The bombardment 2 of the sheet 1 was carried out by means of a beam of Xe ions, with an energy of 574 MeV. The sheet 1 was then subjected to the radiation of a halogen spotlight for 10 hours and then to chemical etching in a 0.02 N solution of NaOCl at 70° C. for 12 minutes. Polypyrrole nanotubes 7 were synthesised chemically in the pores 6 created in the sheet 1. The nanotubes 7 have a substantially cylindrical shape over their entire length and substantially equal diameters, around 80 nm.

Figure 5A:
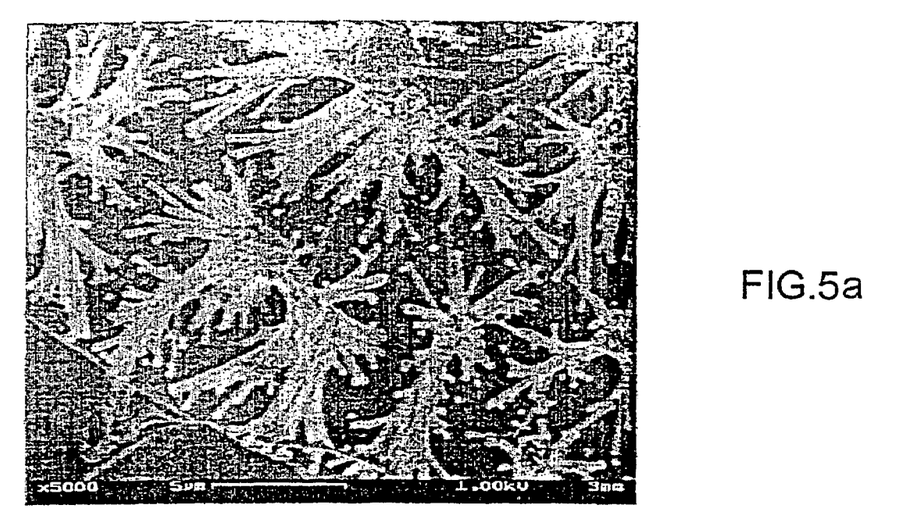
Figure 5B:
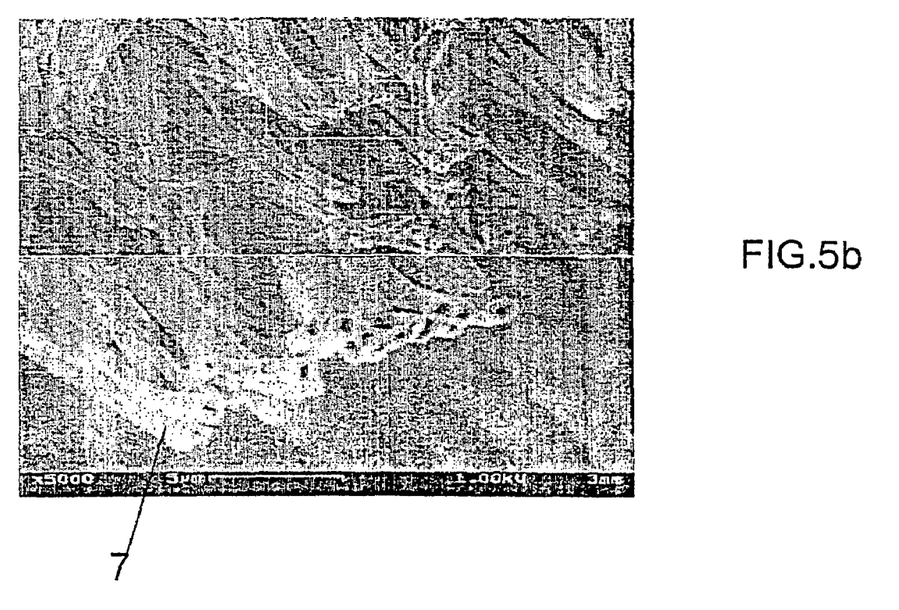

FIGS. 5a and 5b

The bombardment 2 of the sheet 1 was carried out by a beam of Xe ions, with an energy of 574 MeV. The sheet 1 was then subjected for 8 hours to the radiation of a light source composed of 100 LEDs (the individual power of which is between 1 and 10 mW) emitting in the blue range, and then to chemical etching in a 0.2 N solution of NaOCl at 70° C. for 24 minutes. The polypyrrole nanotubes 7, synthesised chemically in the pores 6 created in the sheet 1, there also have a substantially cylindrical shape over their entire length, and substantially equal diameters, around 0.135 µm.

Figure 6:
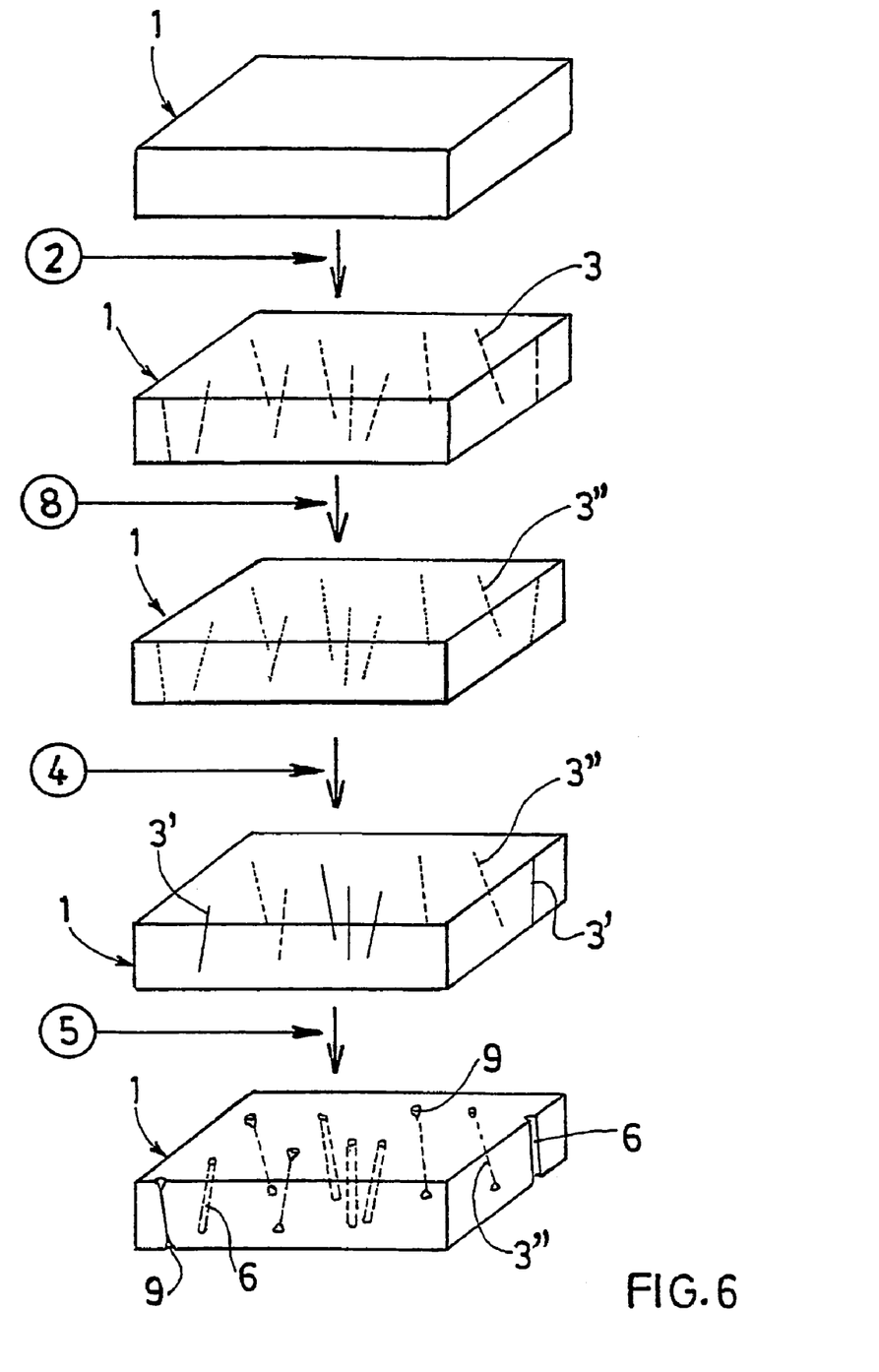
FIG. 6 is a schematic representation of the various steps of the method according to a second embodiment of the invention, for producing a "patterning"

Reference is now made to FIG. 6, which depicts schematically the various steps of a second embodiment of the method, producing a "patterning", that is to say a sheet 1 having pores 6 in predetermined areas. As in the case of the method depicted in FIG. 1, the sheet 1 is first of all subjected to an ion bombardment 2 which results in the formation of traces 3. Next the sheet 1 is subjected to a global heat treatment 8 which causes a partial erasure of the traces 3. The partially erased traces 3" will be attacked very slowly during the subsequent chemical etching step.

Certain predetermined areas only of the sheet 1 are then subjected to radiation in the visible range 4. This can be carried out:

- either by means of a mask comprising orifices allowing visible radiation 4 to pass only onto the said predetermined areas of the sheet 1;
- or by the use of a laser emitting in the visible range, directed exclusively to the predetermined areas of the sheet 1. The use of a laser allows great precision with regard to the areas subjected to the radiation.

The partially erased traces 3" situated in the areas of the sheet 1 subjected to the radiation are sensitised, more marked traces 3' thus being obtained. Conversely, the areas of the sheet 1 not subjected to radiation have only partially erased traces 3".

Finally, the sheet 1 is subjected to chemical etching 5. The parts of the sheet 1 damaged by the previous steps of the method, namely the more marked traces 3', are rapidly etched by the corrosive solution, and hence the creation of pores 6 of substantially cylindrical shape and with substantially equal diameters. On the other hand, the partially erased traces 3" of the sheet 1 situated in the areas of the sheet 1 not subjected to radiation 4 are only very slowly etched chemically. The portions of these partially erased traces 3" situated in the vicinity of one face of the sheet 1 have undergone a start of chemical etching, resulting in the formation of small cavities 9 on the surface of the sheet 1. However, the partially erased traces 3" do not lead to the creation of pores 6 opening out on each of the opposite faces of the sheet 1.

Figure 7A:
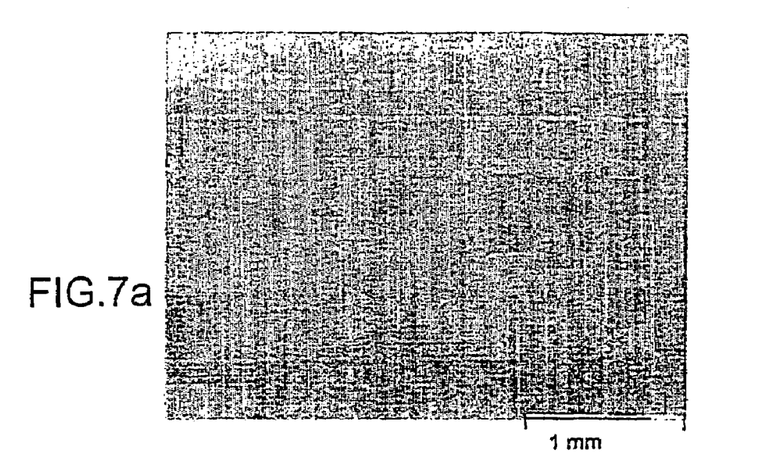
FIGS. 7a to 7c are photographs taken by optical microscopy transparency of a sheet of polyimide having pores obtained by the method shown diagrammatically in FIG. 6.
Figure 7B:
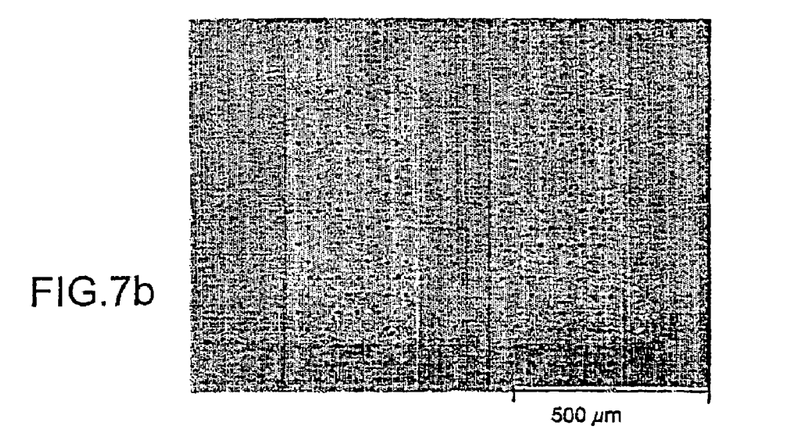
Figure 7C:
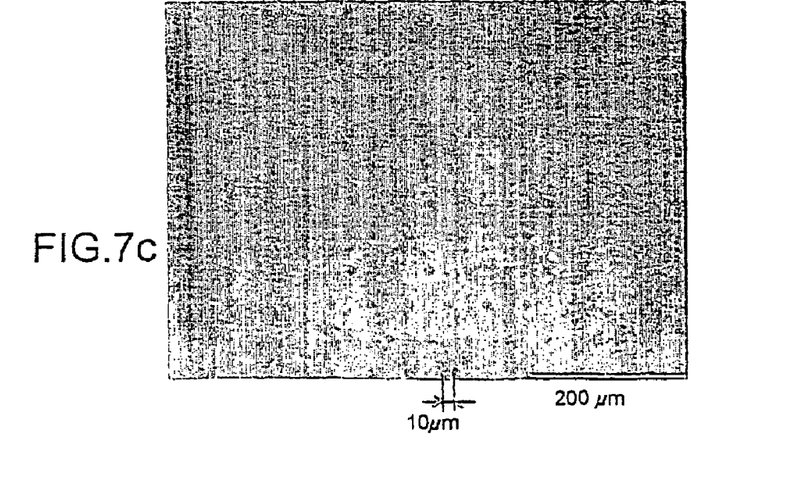

FIGS. 7a to 7c are photographs taken by optical microscopy transparency of a sheet of Kapton® of the HN30 type, with a thickness of 7.6 µm, having pores 6 obtained by "patterning" on certain predetermined areas of the said sheet 1. The bombardment 2 of the sheet 1 was carried out by a beam of Xe ions, with an energy of 574 MeV. The sheet 1 was then subjected for 30 minutes to a global heat treatment at 400° C. and then to selective radiation in the visible range, by means of a mask. Finally the sheet 1 was subjected to chemical etching in a 2N solution of NaOCl at 70° C. for 9 minutes.

In FIGS. 7a to 7c, the dark areas represent porous areas, that is to say comprising pores 6, whilst the lighter areas do not comprise pores 6 or solely initiations of pores (small cavities 9 on the surface of the sheet 1). According to the mask employed, various configurations of areas having pores 6 or not can be obtained.

The method as described above improves the shape of the pores created in the thin sheets of polyimide, as well as the consistency of the diameter of these pores. Thin sheets of nanoporous or microporous polyimide of much better quality can thus be obtained.

The invention claimed is:

1. A method of creating pores of nanometric to micrometric size in a thin sheet of polyimide, in which the sheet is subjected to the steps comprising:
    an ion bombardment;
    a radiation in the visible range of a light emitting diode (LED) or LED's emitting at wavelengths of between 450 and 530 nm for a period of between 1 and 10 hours; and
    a chemical etching.

2. A method according to claim 1, wherein the sheet is subjected to the chemical etching for less than one hour.

3. A method according to claim 1, wherein the sheet is subjected to the chemical etching for less than about 15 minutes.

4. A method according to claim 1, wherein the chemical etching is carried out by using a solution of NaOCl with a concentration of between 0.01 N and 5 N at a temperature of between 30° and 100° C.

5. A method according to claim 1, wherein the sheet is bombarded by a beam of xenon (Xe) ions with an energy of about 570 MeV.

6. A method of creating pores of nanometric to micrometric size in a thin sheet of polyimide, in which the sheet is subjected to the steps comprising:
an ion bombardment;
a radiation in the visible range of a halogen light emitting at wavelengths of between 450 and 530 nm for a period of about 10 hours to one week; and
a chemical etching.

7. A method according to claim 6, wherein the sheet is subjected to the chemical etching for less than one hour.

8. A method according to claim 6, wherein the sheet is subjected to the chemical etching for less than about 15 minutes.

9. A method according to claim 6, wherein the chemical etching is carried out by a solution of NaOCl with a concentration of between 0.01 N and 5 N at a temperature of between 30° and 100° C.

10. A method according to claim 6, wherein the sheet is bombarded by a beam of xenon (Xe) ions with an energy of about 570 MeV.

11. A method of creating pores of nanometric to micrometric size in a thin sheet of polyimide, in which the sheet is subjected to the steps comprising:
an ion bombardment;
a global heat treatment;
a radiation in the visible range, wherein only certain areas of the sheet are subjected to said radiation; and
a chemical etching.

12. A method according to claim 11, wherein the sheet is subjected to radiation whose wavelength is between 450 and 530 nm.

13. A method according to claim 11, wherein a source of said radiation emits radiation in the visible range and gives off a sufficiently low quantity of heat such that cooling of the sheet is not required.

14. A method according to claim 11, wherein the sheet is subjected to radiation of a light emitting diode (LED) or LED's for a period of between 1 and 10 hours.

15. A method according to claim 11, wherein the sheet is subjected to radiation of a halogen light for a period of about 10 hours to one week.

16. A method according to claim 11, wherein the sheet is subjected to radiation of a UV-Hg source coupled to a UV filter, emitting at wavelengths of between 360 to 580 nm.

17. A method according to claim 11, wherein the sheet is subjected to the chemical etching for less than one hour.

18. A method according to claim 11, wherein the sheet is subjected to the chemical etching for less than about 15 minutes.

19. A method according to claim 11, wherein the chemical etching is carried out by a solution of NAOCl with a concentration between 0.01 N and 5 N at a temperature of between 30° and 100° C.

20. A method according to claim 11, wherein the sheet is bombarded by a beam of xenon (Xe) ions with an energy of about 570 MeV.

* * * * *